Patented Dec. 13, 1932

1,891,043

UNITED STATES PATENT OFFICE

OTTO DIELS AND KURT ALDER, OF KIEL, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

HYDRO-AROMATIC KETONES

No Drawing. Application filed June 11, 1929, Serial No. 370,152, and in Germany January 21, 1929.

The present invention relates to hydroaromatic ketones.

We have found that by condensing hydroaromatic mono- or poly-cyclic aldehyde of the following formula:

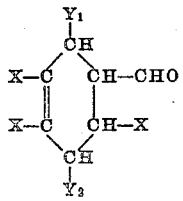

wherein at least one but not more than three of the positions marked X, $Y_1$ and $Y_2$ are occupied by methyl, the others by hydrogen, or $Y_1$ and $Y_2$ jointly stand for $-CH_2-CH_2-$ in which case the X's are hydrogen or one X is methyl, with ketones containing the group $CH_3-CO$ new alpha-beta-unsaturated hydroaromatic ketones are obtained. The aldehydes used in this process may for instance be obtained by condensing alpha-beta-unsaturated aldehydes as for instance acrolein, crotonic aldehyde or the like with compounds which contain a system of conjugated double bonds as for instance butadiene, alkyl-butadiene, cyclo-pentadiene or cyclo-hexadiene. As condensing agents there are used in the present process alkaline reacting products as for instance caustic alkalies, alcoholic pot-assium sodium-methylate or bariumhydroxide.

The new ketones have the following general formula:

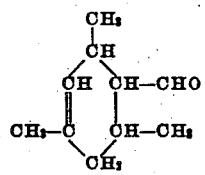

wherein R stands for an organic radical of the group consisting of methyl, ethyl and phenyl, wherein at least one but not more than three of the positions marked X, $Y_1$ and $Y_2$ are occupied by methyl, the others by hydrogen, or $Y_1$ and $Y_2$ jointly stand for $-CH_2-CH_2-$ in which case the X's are hydrogen or one X is methyl.

Generally they represent faintly colored, highly mobile oils forming odoriferous substances of high value. This is a surprising result, since according to Merling (see German specification No. 164,505) the condensation of a hydroaromatic aldehyde with acetone generally does not yield odoriferous substances.

The present process opens a technically practicable way for the preparation of a class of bodies comprising a great variety of scents by condensing with ketones the hydroaromatic mono- or poly-cyclic aldehydes, now easily accessible by synthetic processes and it, therefore, constitutes a very important and technically valuable progress.

The following examples serve to illustrate our invention but they are not intended to limit it thereto, the parts being by weight unless otherwise stated.

1. To a mixture of 150 parts by volume of acetone and 170 parts by volume of the condensation product obtained from 1.3-dimethyl-butadiene and crotonic aldehyde of the following probable formula:

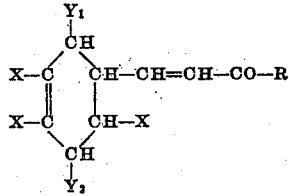

there is added at room temperature a cooled solution of 6 parts of sodium in 60 parts by volume of methylalcohol. The temperature of the reaction mixture which assumes a reddish-brown coloration, rises rapidly from 18° C. to about 46° C. and after about 2 minutes passes through a maximum of heat. The reaction is then caused to stop by addition of a mixture of 25 parts by volume of concentrated sulfuric acid and 15 parts by volume of water. The mixture is then treated with steam until the whole quantity of acetone and methanol is distilled over and the distillate running off becomes turbid. Then the remaining light yellow layer of oil is carefully separated from the aqueous solution, dried by means of sodium sulphate and subjected to a fractional distillation in a vacuum.

At a vacuum of 3 to 4 mm. the first fraction is collected at a temperature up to 80° C.; it contains unaltered aldehyde. An intermediate fraction follows at 80° C. to 100° C. The new product is chiefly obtained at a temperature of from 100° C. to 120° C. The ranges of the boiling temperature can be considerably narrowed by a further vacuum distillation.

In order to remove any traces of unaltered aldehyde, the condensation product is converted into the sulfite compound according to known methods. The aldehyde residues are removed by a prolonged treatment with steam and the condensation product is again freed by means of caustic soda solution from the solution which finally becomes perfectly clear and light yellow.

After a further distillation in the vacuum the condensation product is obtained in the form of a nearly colorless oil boiling at 108° C. under 4 mm pressure at 112° C. under 5 mm pressure; at 134° C. under 14 mm pressure; at 256° C. under 760 mm pressure.

The pure product, when diluted has an intense odor of violets. It has the following probable constitution:

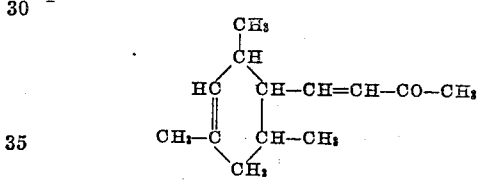

2. To a vigorously stirred mixture of 150 parts by volume of acetone and 140 parts of the condensation product obtainable from 1.3-dimethyl-butadiene and acrolein of the following probable constitution:

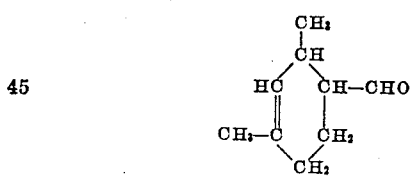

is added a solution of 6 parts of sodium in 60 parts of methyl-alcohol. The reaction takes pace with vehement boiling and is caused to stop after a short time by addition of 25 parts of concentrated sulfuric acid in 50 parts of water.

The easily volatile solvents are removed by means of steam from the reaction mixture until the distillate running over becomes turbid. The layer of oil remaining in the distilling vessel is subjected to distillation in a vacuum; the pure product is contained in the fraction distilling at a temperature of between 100° C. and 115° C. under 4 mm. pressure. After purification by way of the sulfite compound according to known methods an almost colorless liquor is obtained boiling at from 102° C. to 103° C. under 4 mm pressure and having an agreeable long-lasting odor resembling that of roses. It has the following probable constitution:

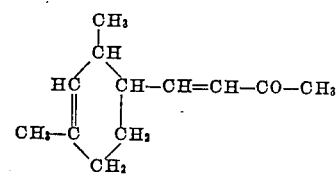

3. A mixture of 24,8 parts of the aldehyde, obtainable by condensing butadiene with crotonic aldehyde and of the following probable constitution:

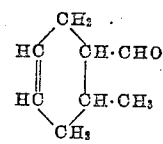

and 50 parts by volume of acetone is cooled to −5° C.; to this mixture is added a solution of 2,4 parts of sodium in 24 parts by volume of methanol. The temperature rises in a few seconds to 45° C. to 50° C. The mixture is subsequently stirred for half a minute to 1 minute and acidified by means of diluted sulfuric acid until there is a feebly acid reaction to Congo paper.

By diluting with about the same volume of water an oil separates which is dissolved in ether. After drying the solution by sodium sulfate the ether is evaporated and the residue is distilled in a vacuum. In this manner an odoriferous substance is obtained smelling strongly of flowers, boiling at from 122° C. to 123° C. under 15 mm. pressure and having the following probable formula:

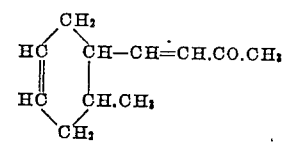

4. A mixture of 152 parts of the aldehyde obtainable by condensing of 1.4-dimethyl-butadiene with crotonic aldehyde and having the probable constitution:

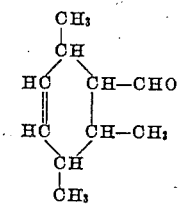

and 116 parts of acetone is treated as above described. After the mixture has been worked up, a product is obtained boiling at between 135° C. and 138° C. under 14.5 mm pressure. It is again purified by means of the sulfite compound and then boils at the distillation at a temperature of from 133° C. to 133.5° C. under 12.5 mm pressure.

The compound is a mobile oil, clear as water, and has an agreeable flower-like odor resembling that of violets. It has probably the following constitution:

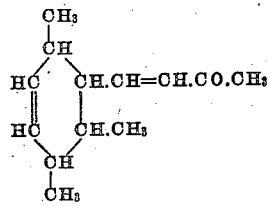

5. 150 parts of the condensation product obtainable from cyclo-hexadiene-(1.3) with crotonic aldehyde (probably 2-methyl-3.6-endoethylene - 1.2.3.6 - tetrahydrobenzaldehyde) and having the following constitution:

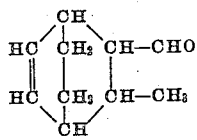

are treated in the usual manner with 116 parts of acetone. By working up this mixture the chief quantity of the new condensation product is obtained in the form of a slight-yellow oil, boiling at between 130° C. and 143° C. under 12 to 13 mm pressure. By a further distillation the compound is obtained in a pure state at between 131° C. and 134° C. under 11 to 12 mm pressure. It is a faintly yellow liquid of an agreeable odor and has the following probable constitution:

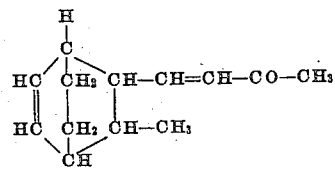

6. 136 parts of the condensation product obtainable from cyclo-hexadiene-(1.3) with acrolein (probably 3.6-endo-ethylene-1.2.3.6-tetrahydrobenzaldehyde) and having the following constitution:

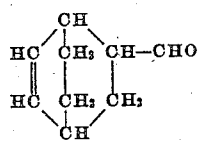

and 116 parts of acetone are condensed with alcoholic potash. On working up the product as usual by distillation the new compound is obtained in a pure state. It boils at between 134° C. and 136° C. under 15 to 16 mm pressure and forms a faintly yellow liquid of an agreeable odor and has the following probable formula:

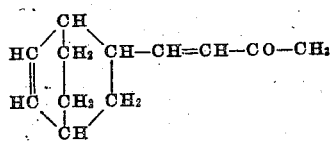

7. To a solution cooled to about 0° C., which consists of 138 parts of 4.5-dimethyl-1.2.3.6 - tetrahydrobenzaldehyde (prepared from 2.3-dimethyl-butadiene and acrolein) of the following formula:

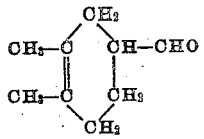

in 116 parts of acetone there is added a solution of 6 parts of sodium in 60 parts of methylalcohol. The mass becomes intense reddish-brown and the temperature rises immediately up to about 60° C. After a short time, the alkali is removed by means of 20 parts of glacial acetic acid and 80 parts of water. A greenish-yellow oil separates. The highly volatile portions are blown off by steam and the remaining oil is distilled under a pressure of 13 mm. at a temperature of from 133° C. to 143° C.; the chief quantity of the new condensation product is distilled in the form of a faintly yellow oil. By a further distillation the compound is obtained in a pure state, boiling under a pressure of 11 to 12 mm. and at a temperature of 135° C. to 137° C. It is a faintly yellow liquid and has the probable constitution:

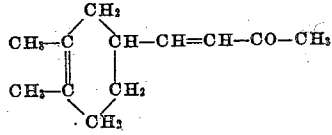

8. To a solution, cooled to about 0° C., which consists of 152 parts of trimethyl-tetrahydrobenzaldehyde (prepared from 2.3-dimethyl-butadiene and crotonic aldehyde) of the following formula:

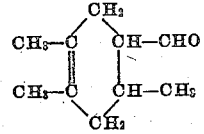

in 116 parts of acetone there is added a solution of 6 parts of sodium in 60 parts of methyl-alcohol. The mass becomes reddish-brown and the temperature rises spontaneously up to about 60° C. After the solution has been allowed to stand for some time, 20 parts of glacial acetic acid and 80 parts of water are added. A greenish-yellow oil separates. The highly volatile portions are blown off by steam and the remaining oil is distilled. At a temperature of 145° C. to 150° C. and under a pressure of 15 mm. a faintly yellow oil distils over with no great quantity of first-runnings; about half the quantity of the oil solidifies to large colorless tablets of the melting point of 52° C.; the liquid portion boils at 120° C. under 4 mm. pressure. Both the new odoriferous substances are probably stereoisomerides of a compound having the following constitutional formula:

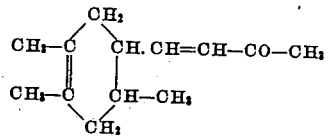

9. To a thoroughly stirred mixture of 138 parts of the aldehyde obtained by condensing 1-methyl-butadiene (piperylene) with crotonic aldehyde and having the following probable constitution:

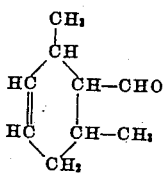

and 116 parts of acetone there is added a solution of 7.7 parts of sodium in 80 parts by volume of methanol. The mixture immediately begins to become brown and the temperature to rise.

It rises at first rapidly, within about 4 minutes from about 20° C. up to 37° C. to 47° C. Thereupon the mixture is acidified with diluted sulfuric acid and further stirred for about 10 minutes. After the mixture has been allowed to stand for some time, the layer of light yellow oil which separates on the surface is removed, repeatedly washed with water and dried with anhydrous sodium sulfate. The oil subsequently is distilled in a vacuum. After some small first-runnings, which consists of unaltered aldehyde, the chief fraction is obtained, boiling at between 115° C. and 160° C. under 15 mm pressure. This fraction is treated with a sulfite solution according to known methods. The lamina crystals which separate on cooling are filtered by suction, washed with a small quantity of ether and mixed with an excess of caustic soda solution of about 20% strength.

The mixture is heated on the water-bath for about 2 hours while stirring until all crystals are dissolved and is subsequently cooled. A nearly colorless oil is separated on the surface. It is taken off, repeatedly washed with water and dried with anhydrous sodium sulfate, and subsequently distilled in a vacuum.

At the second distillation the condensation product boils at 124° C. to 125° C. under 15 mm pressure. It is a mobile oil, clear as water, and has an agreeable flower-like odor resembling that of violets. The compound probably has the following constitution:

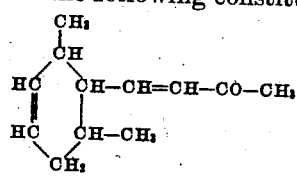

10. To a thoroughly stirred mixture of 138 parts of the aldehyde obtainable by condensing 1.4-dimethyl-butadiene with acrolein and having the following probable constitution:

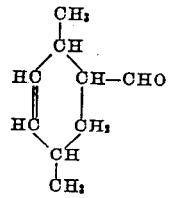

and 116 parts of acetone there is added a solution of 4 parts of sodium in 50 parts of methanol. The mixture immediately begins to become brown and the temperature to rise. It rises within 1½ to 2 minutes from about 20° C. to 56° C. to 57° C. The reaction mixture is then acidified with diluted sulfuric acid and further stirred for about 10 minutes. After the mixture has been allowed to stand for some time, a clear, light yellow oil is separated on the surface; it is taken off, repeatedly washed with water and dried with anhydrous sodium sulfate. The oil is then distilled in a vacuum. After some small first-runnings of unaltered aldehyde, the chief fraction is obtained, boiling at between 120° C. and 135° C. under 13 mm pressure. This fraction is treated with sulfite solution according to known methods, cooled and freed from the impurities by extracting the latter by means of ether. The solution is then heated with an excess of concentrated caustic soda solution and heated on the water-bath for about 1½ hours, while stirring. After cooling, the separated limpid oil is taken off, repeatedly washed with water, dried with sodium sulfate and distilled in a vacuum.

At the second distillation the condensation product boils at 128° C. to 129° C. under 13 mm pressure. It is a mobile refracting oil, clear as water, and has an agreeable flower-like odor resembling that of roses. The compound probably has the following constitution:

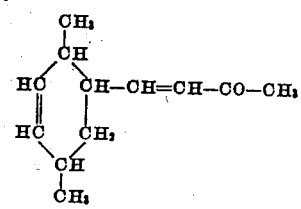

11. To a solution, cooled to about 0° C., which consists of 136 parts of the condensation product obtainable from cyclo-hexadiene with acrolein (probably endo-ethylene-3.6-Δ⁴-tetrahydrobenzaldehyde) of the following formula:

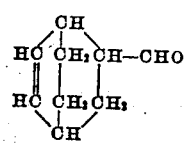

in 144 parts of methyl-ethyl-ketone there is added a solution of 6 parts of sodium in 60 parts by volume of methyl-alcohol. The reaction liquid becomes yellow and the temperature rises spontaneously to about 40° C. to 50° C. After the solution has been allowed to stand for some time, the alkali is removed by means of 20 parts of glacial acetic anhydride and 80 parts of water. A yellow oil is separated. The highly volatile portions are blown off by means of steam and the remaining oil is distilled. Under a pressure of 12 to 14 mm and at a temperature of between 150° C. and 163° C. the chief quantity of the new condensation product distils over in the form of a faintly colored oil. By a further distillation the product is obtained in a pure state at a temperature of between 122° C. and 126° C. under 3 to 5 mm pressure. It forms a light yellow liquid of an agreeable, flower-like odor and probably has the following constitution:

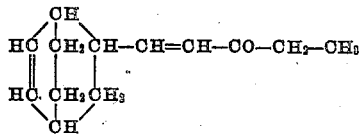

12. To a cooled solution of 152 parts of 3.4.6 - trimethyl - 1.2.5.6-tetrahydrobenzaldehyde (obtainable from 2.3-dimethyl-butadiene and crotonic aldehyde) in 240 parts of acetophenone there is added a solution of 6 parts of sodium in 60 parts of methanol. With the beginning of the reaction the temperature rises immediately and the coloration of the solution turns reddish-brown. After some time the solution is acidified with 20 parts of glacial acetic acid and 80 parts of water; the separating greenish-yellow oil is taken off and subjected to a distillation in a vacuum. The new condensation product distils over at a temperature of from 208° C. to 209° C. under 14 mm pressure (at 185° C. under 4 mm pressure; at 176° C. under 2 mm pressure) and forms a viscous yellow oil. The new compound probably has the following constitution:

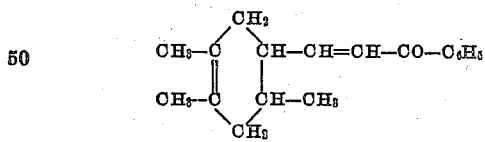

We claim:

1. As new products, compounds of the following general formula:

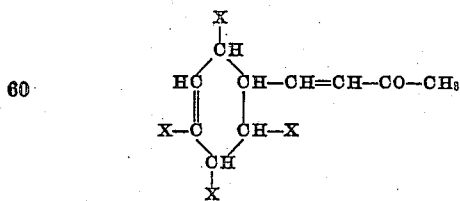

wherein one X represents methyl, one X hydrogen and the other X's hydrogen or methyl, being substances of an agreeable odor.

2. As a new product, the compound of the following formula:

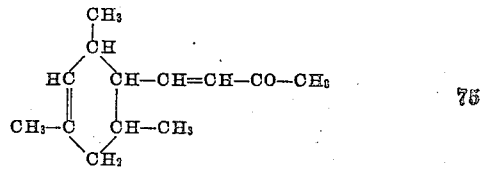

being a colorless oil, boiling at 256° C. and having, when diluted an intense flower-like odor resembling that of violets.

3. As a new product the compound of the following general formula:

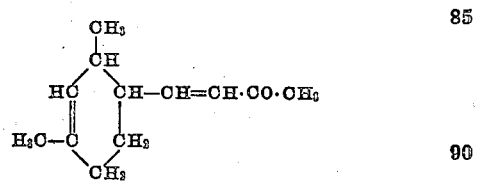

being a colorless oil boiling at 102°–103° C. under 4 mm. pressure and having when diluted an agreeable long lasting odor resembling that of roses.

4. As a new product the compound of the following formula:

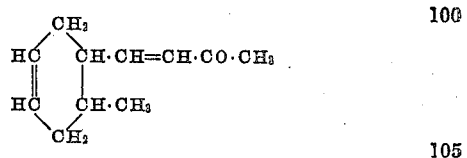

being a colorless oil boiling at 122°–123° C. under 15 mm. pressure and having when diluted a strong flower like odor.

5. As new products, the compounds of the following general formula:

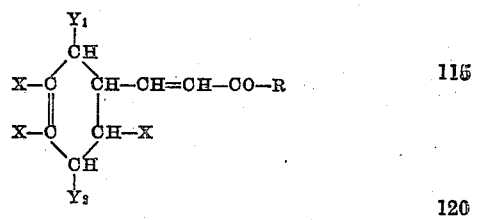

wherein R stands for an organic radical of the group consisting of methyl, ethyl and phenyl, wherein at least one but not more than three of the positions marked X, $Y_1$ and $Y_2$ are occupied by methyl, the others by hydrogen, or $Y_1$ and $Y_2$ jointly stand for —$CH_2$—$CH_2$— in which case the X's are hydrogen or one X is methyl, being substances of an agreeable odor.

6. As new products, the compounds of the following general formula:
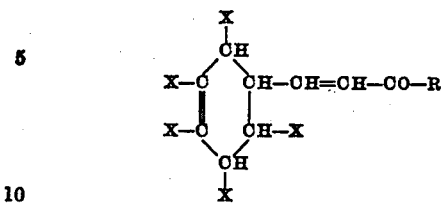
wherein R stands for methyl or ethyl, one X represents methyl, two X's hydrogen and the other X's hydrogen or methyl, being substances of an agreeable odor.
In testimony whereof, we affix our signatures.
OTTO DIELS.
KURT ALDER.